United States Patent Office 3,506,604
Patented Apr. 14, 1970

3,506,604
METHOD OF MAKING LARGE PARTICLE SIZE CARBOXYLATED LATEX AND THE PRODUCTS OBTAINED
Harwell E. Benjamin, Borger, Tex., assignor to Phillips Petroleum Company, a corporation of Delaware
No Drawing. Filed Oct. 12, 1966, Ser. No. 586,046
Int. Cl. C08d 1/09, 7/00
U.S. Cl. 260—29.7                    9 Claims

ABSTRACT OF THE DISCLOSURE

A method of preparation of improved large particle size latexes of inherently curable carboxylated interpolymers by continuous charging of emulsifiers during the reaction period with rate of emulsifier input based on monitoring of latex emulsion surface tension.

---

The invention relates to improved latexes of heat-curable elastomeric interpolymers. In one aspect it relates to those aqueous latexes of elastomers which are formed by polymerization of an open-chain aliphatic conjugated diene, such as butadiene-1,3. In another aspect it relates to an improved method for producing a carboxylated styrene-butadiene latex having a uniform large particle size.

It has been known heretofore that certain polymer latexes are particularly valuable vehicles for use in the preparation of continuous, coherent films and coatings. In such applications the latexes must meet numerous requirements and specifications in regard to their being stable to applied stresses and to environmental exposure. These requirements and considerations as well as many others are well known to a skilled worker in the latex art.

One class of polymer latexes which has had an unusually wide acceptance in the film and coatings field is that of the copolymers of a monovinyl aromatic monomer, such as styrene, and an open-chain aliphatic conjugated diene, such as butadiene-1,3. Such latexes have been tested for use as backings for fabrics, such as tufted carpeting. In that application, however, these prior art elastomeric latexes, when unmodified, exhibit unacceptable wash resistance when the fabrics are exposed to a dye bath at elevated temperatures for prolonged periods of time. When these latexes are formulated with a small amount of sulfur and the polymer is subsequently thermally cured the product shows a measurable improvement in wash bath resistance. Such a technique, however, requires the extra step of incorporating the sulfur additive. In addition, although certain of the properties of the coating are improved, it was found that the color and odor characteristics of the sulfur treated coating are poorer.

It is also known that coatings and films of polybutadiene may be deposited from a latex media. In general, these films and coatings have had chemical and physical properties that are unsatisfactory for commercial exploitation. These polymeric materials may also be cured with sulfur and other similar vulcanizing agents. However, when so cured, they suffer from similar disadvantages to those mentioned above.

As a consequence, it would be desirable to have a latex of an inherently curable interpolymer which would form coatings that retained the elastomeric and other noteworthy properties of the styrene-butadiene type of polymer.

Therefore, it is an object of this invention to provide a process for making a latex of a curable interpolymer containing essentially butadiene-1,3 or similar monomer in the polymeric structure.

Another object of the invention is to provide a process for forming a latex which is film forming, which contains a polymer which is inherently curable without requiring incorporation of separate crosslinking, vulcanizing or similar agents and which has a particle size up to 8000 A.

Another object of this invention is to provide a process for forming a latex which contains a polymer which is self-curable and which consists essentially, in combined form, of about 90 to 99 percent by weight of nonacidic monomeric materials comprising at least 10 percent by weight of an open-chain aliphatic conjugated diene having from 4 to 9 carbon atoms with any remainder of said nonacidic monomeric material being of a monovinyl aromatic monomer and from 10 to 1 percent by weight of a polymerizable unsaturated monocarboxylic acid.

Other objects and many of the attendant advantages of this invention will be readily appreciated as the same becomes better understood by reference to the following detailed description.

As indicated, this invention relates to a process for making a carboxylated terpolymer latex having uniform large particle size comprising the steps of:

(1) Charging to a reaction zone containing a first mercaptan, a redox initiator system dispersed in an aqueous medium and a first portion of an emulsified mixture consisting of at least one anionic and one nonionic emulsifier, a mixture comprising (a) an open chain aliphatic conjugated diene having from 4 to 9 carbon atoms, (b) a monovinyl aromatic monomer containing from 8 to 12 carbon atoms wherein a vinyl group is attached directly to an aromatic nucleus, (c) a monocarboxylic acid monomer and (d) a second mercaptan modifier; and (2) Continuously charging the balance of the emulsifier mixture to said reaction zone throughout the remaining reaction period at a variable rate based on surface tension measurements.

Suitable conjugated dienes having from 4 to 9 carbon atoms are for example, butadiene-1,3; 2-methylbutadiene-1,3; 2,3-dimethylbutadiene-1,3; piperylene, 2-neopentylbutadiene-1,3; and other hydrocarbon homologs of butadiene-1,3, and in addition the substituted dienes such as 2-chlorobutadiene-1,3; 2-cyanobutadiene-1,3; the substituted straight chain conjugated pentadienes, the straight and branched chain hexadienes, octadienes, nonadienes and others having from 4 to 9 carbon atoms. The butadiene-1,3 hydrocarbons, and butadiene-1,3 specifically, are preferred because of their ability to produce particularly desirable polymeric materials. Mixtures of conjugated dienes can also be used.

By the term "monovinyl aromatic monomer," it is intended to include those monomers containing 8 to 12 carbon atoms wherein a vinyl group is attached directly to an aromatic nucleus, such as styrene, 2-methylstyrene, 4-methylstyrene, 2-methyl-5-ethylstyrene, 2,4-dimethylstyrene, 2,3-diethylstyrene, 4-isopropylstyrene, 2-methyl-5-isopropylstyrene, and the like. Such designation is also intended to include halo-substituted compounds, such as 4-chlorostyrene, 3-bromostyrene, 2-ethyl-4-iodostyrene, 2-methyl-3-chlorostyrene, 2,4-dichlorostyrene, and the like. The term is also intended to include mixtures of two or more of the above-named vinyl aromatic monomers. Because of their availability and their ability to produce desirable polymers and for other reasons, it is preferred to use styrene or a methylstyrene as the monovinyl aromatic monomer constituent.

The present invention comprehends the use of all ratios of the aforementioned noncarboxylic monomeric materials as long as the resulting terpolymer contains in combined form at least about 10 percent by weight of the diene. The monovinyl aromatic compound is present in combined form in the range of 20–80 percent by weight of the resulting terpolymer. Outside these ratios the polymers generally do not exhibit the desired community of properties, such as the requisite scrim adhesion for the preparation of coatings of the type contemplated herein.

To achieve the stated benefits and advantages of the subject invention, it is requisite that in addition to the comonomers, the terpolymer also contains interpolymerized within the polymer molecule an acidic monomer selected from the unsaturated monocarboxylic acids. Typical of the unsaturated monocarboxylic acids that can be employed are acrylic acid, methacrylic acid (alpha-methylacrylic acid), ethylacrylic acid (alpha-ethylacrylic acid), alpha-chloroacrylic acid, crotonic acid, and the like. A preferred carboxylic acid monomer is methacrylic acid.

The weight of combined acidic monomer should be from about 1 to about 10 percent of the total weight of the interpolymer. When there is less than 1 percent there is generally an insufficient number of carboxy groups present to achieve curability. When there is more than about 10 percent, polymers become more water-sensitive, are more difficult to prepare without precoaguluum, and the monomeric mixture is noticeably corrosive to the polymerization equipment and in general the polymers are undesirable.

The present invention falls in the area of emulsion polymerization. As is known in this field, the preparation of a polymer latex involves many variables which to a large extent are known in the art. It has been discovered that in order to achieve the objects set forth hereinabove, it is necessary that an anionic and a nonionic emulsifier be used concomitantly wherein the percentage of each can vary from 30 to 70 percent of the total emulsifier mixture. One to 10 total parts of emulsifier, preferably 2 to 5 parts, are used per 100 parts by weight of total monomers (p.h.m.). The ratio of nonionic to anionic emulsifier varies with the amount of acrylic monomers used, and with a high amount of the acrylic monomer being present larger amounts of anionic emulsifiers are employed.

The anionic emulsifiers are well known to the industry, and are selected, for example, from the group consisting of sodium dihexylsulfosuccinate, tetrasodium N-(1,2-dicarboxyethyl)-N-octadecyl-sulfosuccinate; sodium dioctyl sulfosuccinate, sodium diamyl sulfosuccinate, sodium alkylaryl polyether sulfonates, sodium alkylaryl polyether sulfates, dioctyl sodium sulfosuccinate, fatty alcohol alkylolamine sulfonates, sodium lauryl sulfate, alkylaryl sulfonates, alkylaryl sodium sulfonates, and alkylbenzene sodium sulfonates.

The nonionic emulsifiers are also well known to the industry and are, for example, the polyether alcohols prepared by condensing ethylene oxide with higher alcohols. Examples of materials that can be used are octyl phenyl polyethoxy ethanol, isooctyl phenyl polyethoxy ethanol, nonyl phenyl polyethoxy ethanol, alkylaryl polyethylene glycol ethers, and the like.

In the procedure of this invention, the polymerization is initiated with a small amount of emulsifier, preferably 0.05 to 0.5 p.h.m., present in the reactor and the balance of the emulsifier is added continuously throughout the entire reaction period, which lasts from 10 to 50 hours. After the monomers have been added only enough emulsifier addition is necessary to stabilize the latex and to prevent the formation of new micelles which increases the possibility of forming prefloc.

This polymerization technique consists, for example, of metering emulsifier solution and monomers to a reactor containing the initiator. The initiator and 80 to 85 percent of the total water charge are heated in the reactor to reaction temperature, and a small amount of the emulsifier (blended emulsifiers) is added to the reactor. After a few minutes (3 to 5 minutes, for example) addition of the monomers is started to the reactor at a constant rate. Then, additional emulsifier is added to the polymerization at a variable rate based on surface tension measurements. The surface tension is maintained between 33 and 55 dynes per centimeter. Low surface tension values place the system in position for forming new micelles, and high surface tension values are a warning of possible prefloc or unstable latex. Forming new micelles after the batch has been initiated may also cause prefloc near the end of the run and/or high emulsifier usage. The emulsifier is metered at a faster rate during the monomer addition time than during the rest of the run since emulsifier is needed not only for the growing particles but for the added monomers.

The final latex usually shows an iridescent color which is characteristic of large uniform particles. Electron microscope pictures verified that some of the experimental latexes had a particle size in the range of 3000 A. The latex particles can range in size from 400 to 8000 A. The latexes also showed a low viscosity at 50 percent solids which is another indication of large particle size.

The catalysts that are commonly and traditionally employed in emulsion polymerization are the water-soluble per-compounds, mixtures of water-soluble and monomer-soluble per-compounds, and other compounds of similar decomposition mechanism. Typical of the useful water-soluble catalysts are hydrogen peroxide, potassium persulfate, and the like. Small amounts of monomer-soluble materials, such as the organic peroxides, including benzoyl peroxide and lauroyl peroxide, have also been used in conjunction with the water-soluble catalyst. If desired, however, the other known catalysts, including the complex catalysts, such as the so-called redox systems consisting of a combination of oxidizing agent and reducing agent, can be used. Redox catalyst systems are well known, and are discussed, for example, in Synthetic Rubber edited by G. S. Whitby, John Wiley & Sons, New York, N.Y., 1954, pages 13–15, 217, 261–268, 272–274, 276–278, and 971–981. A preferred redox catalyst is potassium persulfate-sodium bisulfite.

The potassium persulfate oxidizing agent is used at a concentration level of 0.1 to 1 part by weight per hundred parts of monomer (p.h.m.) and the sodium bisulfite reducing agent is used at a concentration level of 0.01 to 0.1 p.h.m. The ratio of persulfate to bisulfite is in the range between 5:1 to 100:1.

The potassium persulfate-sodium bisulfite initiator is first added to the reactor along with a small amount of emulsifier which was stated hereinabove.

The use of mercaptan modifiers in the reaction mixture is often desirable. Modifiers such as the primary, secondary, and tertiary aliphatic mercaptans containing from 4 to 16 carbon atoms appear to have a greater modifying efficiency in the diene system of this invention than in the polymerization of the conventional synthetic rubbers. The mercaptan modifier particularly adaptable to this invention is selected from the group consisting of tertiary $C_9$ to $C_{16}$ mercaptans such as tertiary nonyl mercaptan, tertiary decyl mercaptan, tertiary dodecyl mercaptan, tertiary tetradecyl mercaptan, tertiary hexadecyl mercaptans, and mixtures thereof, and is used at a concentration level of about 0.1 to 0.5 p.h.m. A portion of the modifier (5 to 25 percent) is charged to the reactor with the initiator mixture prior to addition of the monomers and the balance is then added simultaneously with the monomers.

The polymerization reaction is carried out at a temperature of from 100 to 200° F. in the presence of 50 to 500 p.h.m. of water, part of which can be used to dilute the emulsifier mixture.

While the polymerization may be carried out in the presence of air, the rate of reaction is ordinarily faster in the absence of oxygen and hence polymerization in an evacuated vessel under an inert atmosphere such as nitrogen is preferred.

Any of the known shortstopping agents such as ditertiarybutylhydroquinone, sodium dibutyldithiocarbamate and the like can be used to terminate the polymerization at the end of the reaction period.

Following the shortstopping reaction, it is desirable to adjust the pH of the mixture to a range between 9 to 10 in order to produce a low-foaming latex. It is preferred that ammonia or ammonium hydroxide be added to the reaction mixture both before and after stripping or strip concentration of the latex.

The latexes of this invention can be formulated with conventional additives such as pigments, dyes, photostabilizers, preservatives and the like, which are commonly added in paints, adhesives and similar compositions.

Advantages and benefits of the improved process for forming the latexes of this invention will be more apparent from the following illustrative examples wherein all concentrations are on a parts by weight per hundred parts of monomers (p.h.m) basis.

EXAMPLE I

A latex was prepared using the following recipe and conditions:

Reactor charge: P.h.m.

$K_2S_2O_8$ _____ 0.50
$NaHSO_3$ _____ 0.01
Emulsifier mixture _____ 0.50
Mixed tertiary mercaptans _____ 0.05
Water _____ 104

Emulsifier mixture:
Sodium alkaryl polyether sulfate _____ 1.31
Isooctylphenylpolyethoxyethanol _____ 1.96
Water _____ 13.1

Monomer mixture:
Butadiene _____ 40
Styrene _____ 55
Methacrylic acid _____ 5
Mixed tertiary mercaptans [1] _____ 0.10

Reaction conditions:
Temperature, °F. _____ 140
Time, hr. _____ [2]17.2

[1] A mixture of mercaptans containing 60 weight percent tertiary dodecyl mercaptan, 20 percent tertiary tetradecyl mercaptan, and 20 percent tertiary hexadecyl mercaptan.
[2] 100 percent conversion in 16 hours.

Procedure: The reactor charge was added to a nitrogen-purged reactor. The monomer mixture was added continuously and uniformly during the first 8.5 hours. The emulsifier mixture not used in the reactor charge was added continuously during the total reaction period and at such a rate that the surface tension was maintained between 36 and 43 dynes/centimeter; the following amount of total emulsifiers was present at the indicated time:

Total emulsifiers, p.h.m: Time, hr.
1.62 _____ 8.0
1.82 _____ 10.0
2.75 _____ 11.0
3.27 _____ 17.2

Following blowdown the latex was shortstopped with 0.15 p.h.m. of ditertiarybutylhydroquinone, 0.02 p.h.m. of a high-viscosity polydimethylsiloxane (Dow-Corning Antifoam A) was added, pH was adjusted to 9.2 by addition of ammonium hydroxide, and 1.25 p.h.m. of tri-(nonylphenyl)phosphite antioxidant was added. The solids concentration in the latex at the end of the reaction was 46.5 percent. The latex was stripped and concentrated to 47.6 percent solids and the pH was readjusted to 10.0 by addition of ammonium hydroxide.

The final latex had an iridescent purple color, indicating that a uniform large particle size latex was obtained.

Properties of the polymer in the final latex are:

Scrim Adhesion, lb./in. ([1]):
Cured 9 min., 300° F. _____ 3.3
Cured 14 min., 300° F. _____ 7.0

[1] A carpet backing formulation is prepared by mixing 353 g. of latex with 47 ml. distilled water and 25 ml. of a solution containing 51.2 g. of tetrasodium pyrophosphate and a few drops of 28% ammonium hydroxide in 1 liter of water for 5 minutes in a Hobart kitchen mixer at #1 speed, adding 386 grams of Whiting #10 (a natural, dry-ground calcium carbonate) and 6 drops of a 25 percent solution of a high-viscosity polydimethylsiloxane (Dow-Corning Antifoam B), mixing an additional 5 minutes, adding a mixture of 0.9 g. hydroxyethylcellulose in 10 ml. distilled water, mixing until the viscosity is 1750±250 cps., allowing the mixture to stand 8 to 24 hours, and adjusting the viscosity to 220±50 cps. by adding water. The compounded latex is applied to the center 7″ x 15″ part of a 7″ x 17″ section of carpet at the rate of 26 to 32 oz./sq. yd., and is spread evenly with a glass rod. The carpet is placed, face up, on a 7″ x 17″ piece of jute, rolled 3 times with a piece of 2-inch schedule 80 steel pipe 15 inches long under pipe pressure only, clamped at each end with Type C binder clamps with a 7-lb. weight on the bottom clamp, rolled once up and once down on a marriage roll with the carpet 15° from the vertical and the carpet next to the roll, and cured for the indicated time in a forced-draft oven at 300° F. Four 2″ x 8.5″ samples are cut from the center of the 7″ x 17″ section, hung on hook scales, and the jute is pulled from the carpet. The average pull required for the four samples, in lb./in. is reported as the scrim adhesion value.

| Run No. | Sodium dihexyl sulfosuccinate | Tetrasodium-n-(1,2-dicarboxyethyl) n-octadecylsulfosuccinate | Sodium alkaryl polyether sulfonate | Sodium alkaryl polyether sulfate | Nonionic P.h.m. | Nonionic Triton | Scrim adhesion, lb./in. |
|---|---|---|---|---|---|---|---|
| 1 [1] | 2.1 | 2.9 | | | | | 1.5 |
| 2 | | 2.32 | | | 1.54 | Octylphenylpolyethoxyethanol. | 3.0 |
| 3 | | 2.25 | | | 1.50 | Isooctylphenylpolyethoxyethanol. | 7.5 |
| 4 | | | 1.6 | | 2.4 | Isooctylphenylpolyethoxyethanol. | 6.0 |
| 5 | | | 1.8 | | 1.8 | Isooctylphenylpolyethoxyethanol. | 5.2 |
| 6 | | 1.95 | | | 1.3 | Nonylphenylpolyethoxyethanol. | 6.0 |
| 7 | | | 1.0 | | 3.0 | Alkarylpolyethyleneglycol ether. | 7.5 |
| 8 | | | | 1.31 | 1.96 | Isooctylphenylpolyethoxyethanol. | 7.0 |

[1] 55 styrene/42 butadiene/3 methacrylic acid.

7

The high scrim adhesion indicates that it is highly desirable for carpet backing.

EXAMPLE II

Latexes were prepared in the same manner as in Example I, maintaining the surface tension between 36 and 43 dynes/centimeter, except that different emulsifiers were used and the total reaction period was varied from 12 to 21 hours:

It is apparent that a polymer having a high scrim adhesion is obtained when mixed anionic and nonionic emulsifiers are employed in the polymerization, and that use of anionic emulsifiers alone does not give a high scrim adhesion.

EXAMPLE III

A latex was prepared in the same manner as in Example I, maintaining the surface tension between 36 and 43 degrees/centimeter. Following the stripping-concentration, the pH was readjusted to about 10 by ammonium hydroxide addition on half the latex and was not readjusted on the other half:

|  | pH adjustment | No pH adjustment |
|---|---|---|
| pH | 10.3 | 6.2 |
| Solids, percent | 50 | 51 |
| Foam, percent [1] | 97 | 211 |
| Scrim adhesion, lb./in | 6.5 | 5.8 |

[1] Percentage foam is determined by blending 350 ml. of latex in a Waring blender at 15,000 r.p.m. for 3 minutes, measuring the final volume, and calculating by the following formula:

$$\text{Percent foam} = 100 \times \frac{\text{Final volume} - \text{Initial volume}}{\text{Initial volume}}$$

It is apparent that the foaming tendency of the latex was reduced and that a polymer having a better scrim adhesion resulted from pH readjustment.

EXAMPLE IV

An attempt was made to prepare a latex using the recipe and conditions of Example I except that the "emulsifier mixture" and "monomer mixture" of that example together with 90 p.h.m. of water were charged to the reactor initially, and the "reactor charge" together with 14 p.h.m. of water was added when reaction temperature was reached. In 2.5 hours the conversion was 60 percent and more prefloc than latex was obtained.

EXAMPLE V

An attempt was made to prepare a latex using the recipe and conditions of Example I except that the "reactor charge" and "emulsifier mixture" of that example were charged to the reaction initially, and the "monomer mixture" was charged as in that example. In 5.7 hours the conversion was 60 percent and heavy prefloc was obtained.

EXAMPLE VI

An attempt was made to prepare a latex using the recipe and conditions of Example I except that the "reactor charge" and "monomer mixture" were charged to the reactor initially, and the "emulsifier mixture" was charged as in that example. During the first 4 hours a water-in-oil emulsion having the consistency of thick paste was formed. After 2.5 p.h.m. of mixed emulsifiers had been added, the emulsion broke to the normal oil-in-water type. High conversion and prefloc were obtained in 12.5 hours.

Obviously, many modifications and variations of the present invention are possible in the light of the above teachings. It is therefore to be understood that within the scope of the appended claims the invention may be practiced otherwise than as specifically described herein.

What is claimed is:
1. A process for making a latex of carboxylated interpolymer, said latex having uniform large particle size, comprising the steps of:
(a) contacting in aqueous emulsion a redox initiator system, a first portion of an emulsifier mixture consisting of at least one anionic and one nonionic emulsifier; and a monomer mixture comprising an open-chain aliphatic conjugated diene having from 4 to 9 carbon atoms, a monovinyl aromatic monomer containing from 8 to 12 carbon atoms wherein a vinyl group is attached directly to an aromatic nucleus, and an unsaturated monocarboxylic acid monomer, to form a latex; and
(b) thereafter charging the balance of the emulsifier mixture at a variable rate to maintain the surface tension of the reaction mixture between about 33 and about 55 dynes per centimeter, said charging continuing in substantially continuous fashion to said latex substantially throughout the remaining reaction period until said large particle size is obtained.

2. A process according to claim 1 further including the step of stabilizing the finished latex with a basic material.

3. A process according to claim 1 further including the steps of shortstopping the reaction and strip concentrating the latex after the shortstopping step.

4. A process according to claim 1 further characterized in that the open-chain aliphatic conjugated diene is butadiene-1,3 and the monovinyl aromatic monomer is styrene and the monocarboxylic acid monomer is methacrylic acid.

5. The process according to claim 1 further characterized in that the redox initiator comprises a mixture of potassium persulfate and sodium bisulfite and the emulsifier mixture comprises a mixture of sodium alkaryl polyether sulfate and isooctylphenylethoxy ethanol.

6. The process according to claim 1 wherein the emulsifier is present in the range of 2–5 parts per 100 parts by weight of total monomer, the total reaction time ranges from 10 to 50 hours, potassium persulfate is present in the range of 0.1 to 1 part per 100 parts by weight of total monomer, sodium bisulfide is present in the range of 0.01 to 0.1 part per 100 parts by weight of total monomer, mercaptan modifier is mixed tertiary mercaptans and is present in the range of from 0.02 to 2 parts per 100 parts of monomer, and the methacrylic acid is present in sufficient amount to provide in combined form in the range of 1 to 10 parts per 100 parts of polymer.

7. The process according to claim 6 further characterized in that water is present in the amount of 50 to 500 parts per 100 parts of monomer and the reaction is carried out at a temperature within the range of 100 to 200° F.

8. The process of claim 1 wherein step (a) includes the addition of a mercaptan modifier consisting of tertiary $C_9$ to $C_{16}$ mercaptans and mixtures thereof at a concentration level of from about 0.005 to about 0.125 p.h.m.

9. The process of claim 8 wherein the balance of the mercaptan modifiers consisting of tertiary $C_9$ to $C_{16}$ mercaptans and mixtures thereof is added simultaneously with the monomers at a concentration level of mercaptan modifier of about 0.1 to 0.5 p.h.m. including the portion added in step (a).

References Cited

UNITED STATES PATENTS

| 2,868,754 | 1/1959 | Eilbeck et al. |
| 3,288,887 | 11/1966 | Yoshino et al. _____ 260—880 |
| 3,078,246 | 2/1963 | Musch. |
| 3,256,233 | 6/1966 | Hahn et al. |

FOREIGN PATENTS

| 790,070 | 2/1958 | Great Britain. |

M. TILLMAN, Primary Examiner

W. J. BRIGGS, SR., Assistant Examiner

U.S. Cl. X.R.

117—161; 161—67; 260—41.5, 80.7